United States Patent
Abe et al.

(10) Patent No.: US 6,372,319 B1
(45) Date of Patent: Apr. 16, 2002

(54) NUCLEATING AGENTS FOR CRYSTALLIZED GLASSES, CRYSTALLIZED GLASSES, MAGNETIC DISCS SUBSTRATE AND MAGNETIC DISCS

(75) Inventors: Masahiro Abe, Nagoya; Itaru Yasui; Yusuke Yamada, both of Tokyo, all of (JP)

(73) Assignee: NGK Insulators, Ltd., Nagoya (JP)

(*) Notice: Subject to any disclaimer, the term of this patent is extended or adjusted under 35 U.S.C. 154(b) by 0 days.

(21) Appl. No.: 09/392,130

(22) Filed: Sep. 8, 1999

(30) Foreign Application Priority Data

Sep. 10, 1998 (JP) .......................................... 10-272461

(51) Int. Cl.[7] .................................................. G11B 5/82
(52) U.S. Cl. ...................... 428/65.3; 428/141; 428/426; 428/694 SG; 428/694 ST; 501/4; 501/7
(58) Field of Search .................... 428/694 SG, 694 ST, 428/426, 141, 65.3; 501/4, 7

(56) References Cited

U.S. PATENT DOCUMENTS 3,238,085 A * 3/1966 Hayami et al. ................. 161/1
3,951,670 A * 4/1976 Bush .......................... 106/39.7
4,519,828 A * 5/1985 Beall et al. .................... 65/3.3

FOREIGN PATENT DOCUMENTS

JP 9-35234 2/1997
JP 9-208260 8/1997

* cited by examiner

Primary Examiner—Stevan A. Resan
(74) Attorney, Agent, or Firm—Burr & Brown

(57) ABSTRACT

A nucleating agent for producing a crystallized glass, which nucleating agent is to make fine particles at least in the cristobalite phase when added into the crystallized glass containing at least the cristobalite phase, and includes one or more kinds of metallic compounds selected from the group consisting of molybdenum compounds and tantalum compounds.

42 Claims, 2 Drawing Sheets

NUCLEATING AGENTS FOR CRYSTALLIZED GLASSES, CRYSTALLIZED GLASSES, MAGNETIC DISCS SUBSTRATE AND MAGNETIC DISCS

BACKGROUND OF THE INVENTION (1) Field of the Invention

The present invention relates to nucleating agents for crystallized glasses, crystallized glasses, magnetic disc substrates and magnetic discs.

(2) Related Art Statement

Magnetic disc substrates made of crystallized glasses have recently been investigated. In the crystallized glass, almost all alkali metal ions contained are present in the crystalline phase, whereas a very small amount of alkaline metal ions exist in the glass matrix. Accordingly, a problem that a magnetic film is corroded with an alkali metal component dissolves out.

With the development in the mass media, a demand for recording a large volume of information, particularly, such as image information, in a more miniaturized magnetic disc has been increasing, so that further improvement on the recording density of the magnetic discs has been sought. As a result, it has been demanded that the center line average height (Ra) be reduced to a level of not more than 10 Å especially in the read/write zone of the magnetic disc.

However, hardness of the crystalline phase differs from that of the amorphous phase in the crystallized glass. Owing to this, fine uneven portions are inevitably formed between the crystalline phase and the amorphous phase even after polishing. Consequently, it has been difficult to reduce the center line average height of the worked surface of the crystallized glass to not more than 10 Å. Particularly with respect to a magnetic disc substrate made of $Li_2O$—$Al_2O_3$—$SiO_2$ based crystallized glass, it is extremely difficult to satisfy the above requirement. Although the center line average height of the non-crystallized glass or glass, on the way of crystallization, having a low crystallization degree will be able to be reduced to not more than 10 Å after fine polishing, such materials have relatively low strength.

In JP-A 9-208,260, the applicant tried to obtain a magnetic disc substrate having the surface roughness of 2 to 10 Å by using a magnetic disc substrate body made of a crystallized glass with a specific composition and finely polishing the substrate body. NGK insulators, Ltd. discovered that the center line average height of the finely polished surface can be reduced to a level of 20 Å or less if a specific $Li_2O$—$Al_2O_3$—$SiO_2$ based crystallized glass is used, and concretely disclosed the magnetic disc substrate using this crystallized glass in JP-A-9-35234.

The present inventors' investigation clarified that it is advantageous to precipitate a lithium disilicate and a cristobalite phase in the $Li_2O$—$Al_2O_3$—$SiO_2$ based crystallized glass so as to control the coefficient of thermal expansion thereof in an appropriate range and give a magnetic disc substrate having high strength.

However, since particularly the cristobalite phase is likely to cohere during the crystallization, the cohered particle diameter may reach as much as 0.5 μm. If a considerable amount of the cristobalite phase is produced in the crystallized glass and coexists with the lithium disilicate there, it causes a problem that it is difficult to proceed with working the crystallized glass, because the hardness of the cristobalite phase is higher than that of the lithium disilicate and higher than that of the matrix of the amorphous phase. That is, since the cristobalite coheres, it was difficult to reduce the center line average height after finely polishing the magnetic disc substrate to a lower level, for example, to a level of 10 Å or less.

SUMMARY OF THE INVENTION

It is an object of the present invention to prevent cohesion of the cristobalite and make particles in the cristobalite in the $Li_2O$—$Al_2O_3$—$SiO_2$ based crystallized glass when the lithium disilicate phase and the cristobalite phase are precipitated.

It is another object of the present invention to provide a nucleating agent which promotes the dispersion of the cristobalite phase in the crystallized glass.

The nucleating agent according to the present invention is to make fine particles at least in the cristobalite phase when added into the crystallized glass containing at least the cristobalite phase, and comprises one or more kinds of metallic compounds selected from the group consisting of molybdenum compounds and tantalum compounds.

Further, the present invention relates to an $Li_2O$—$Al_2O_3$—$SiO_2$ based crystallized glass comprising lithium disilicate, $Li_2O$—$2SiO_2$, as a main crystalline phase, a cristobalite phase as a sub-crystalline phase, and one or more kinds of metallic oxides selected from the group consisting of molybdenum oxide and tantalum oxide in a total amount of 0.5 to 7.0% by weight.

The present invention also relates to a magnetic disc substrate made of the above crystallized glass, which has a flat and smooth surface with a center line average height (Ra) of not more than 10 Å, preferably not more than 8 Å, and more preferably not more than 6 Å or not more than 5 Å.

The present invention further relates to a magnetic disc comprising the above magnetic disc substrate, an under film formed on the flat and smooth surface of the substrate, and a magnetic metallic layer formed on the under film.

The present inventors discovered that when compounds producing molybdenum oxide and tantalum oxide, respectively, are incorporated into a crystallized glass having such a composition as being capable of producing a cristobalite phase after thermal treatment, the compounds function as an auxiliary nucleating agent, so that the dispersion of the cristobalite is prompted and made finer.

This nucleating agent was suitable particularly for the $Li_2O$—$Al_2O_3$—$SiO_2$ based crystallized glass comprising lithium disilicate, $Li_2O$—$2SiO_2$ and the cristobalite as a main crystalline phase. As a result, its center-line average height could be reduced to not more than 6 Å or not more than 5 Å, for example, by finely polishing the surface of the crystallized glass.

These and other objects, features and advantages of the invention will be apparent from the following description of the invention when taken in conjunction with the attached drawings, with the understanding that some modifications, variations and changes could be easily made by the skilled person in the art to which the invention pertains.

BRIEF DESCRIPTION OF THE INVENTION

For a better understanding of the invention, reference is made to the attached drawings, wherein.

DETAILED DESCRIPTION OF THE INVENTION

Figure 1:
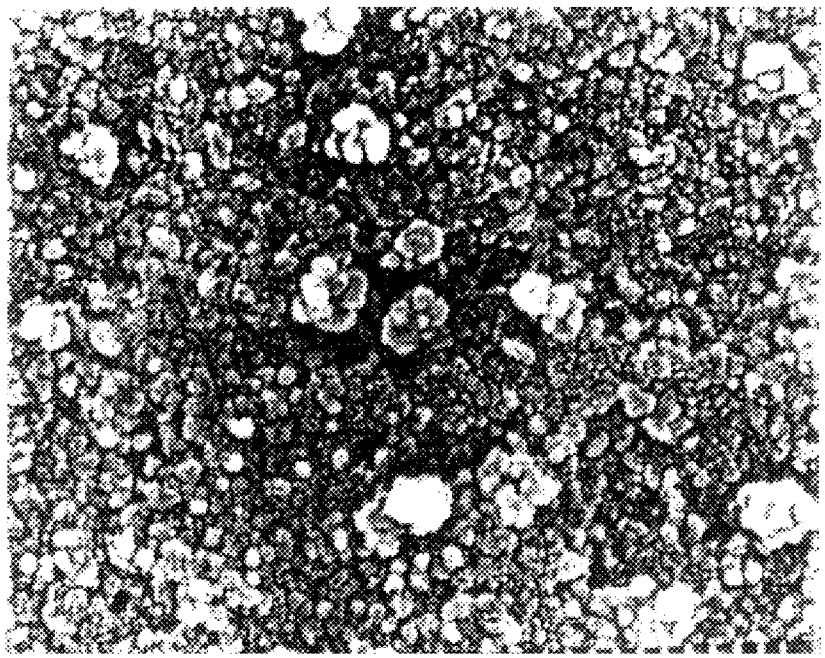
FIG. 1 is a microphotograph of a microstructure in Experiment No. 14 in which particles in a cristobalite are seen to be cohered at particle diameters of around 0.5 μm.

The present invention will be explained in more detail with reference to the attached drawings.

The addition amount of the nucleating agent to the crystallized glass according to the present invention may be varied depending upon the composition and the crystalline phase(s) of the crystallized glass, but the nucleating agent functions to promote the dispersion of the cristobalite phase.

The crystallized glass for the magnetic disc substrate preferably has a coefficient of thermal expansion of $80 \times 10^{-7}$ to $120 \times 10^{-7}/k$, more preferably $85 \times 10^{-7}$ to $110 \times 10^{-7}/k$. This is because the drive shaft to support the magnetic disc substrate is made of SUS having a coefficient of thermal expansion of around $100 \times 10^{-7}/k$, and if the coefficient of thermal expansion of the substrate largely differs from that of the shaft, the substrate may be deformed to cause trouble in recording/reproducing. For this purpose, it is important that the coefficient of thermal expansion of the crystallized glass falls in the above range.

The thermal expansion of the crystallized glass is influenced by the kinds and the amounts of the crystalline phases and the composition and the amount of the glass phase remaining in the crystallized glass.

More specifically, if only lithium disilicate is precipitated as a main crystal in the $Li_2O$—$Al_2O_3$—$SiO_2$ based crystallized glass having lithium disilicate a the main crystal phase, the coefficient of thermal expansion of the crystallized glass is around $75 \times 10^{-7}$ to $80 \times 10^{-7}/k$. In order to set the coefficient of thermal expansion of the crystallized glass of this type in the above range of $80 \times 10^{-7}$ to $120 \times 10^{-7}/k$, one may increase the coefficient of thermal expansion of the glass phase remaining in the crystalline glass. For this purpose, it may be considered to increase an alkaline component in the glass. However, according to this measure, the effect in increasing the coefficient of thermal expansion is not so conspicuous, but it is feared that the weather resistance of the magnetic disc may be deteriorated.

Further, in order to set the coefficient of thermal expansion of the crystallized glass is around $80 \times 10^{-7}$ to $120 \times 10^{-7}/k$, one may precipitate a crystalline phase having a large thermal expansion or a crystalline phase causing a volumetric expansion through a phase transformation. As such a crystalline phase, a cristobalite phase, a quartz phase and an eucryptite phase may be recited.

With respect to the crystallized glass of such a type, the present inventors selected the cristobalite phase among various auxiliary crystalline phases such as the cristobalite phase, the quartz phase and the eucryptite phase, and precipitated the cristobalite phase in the crystallized glass. At that time, it was discovered that a peak intensity I of the cristobalite phase, CR1, needs to be not less than 20 and not more than 70 as measured by an X-ray diffraction method, so that the coefficient of thermal expansion of the crystallized glass may be controlled to a range of $80 \times 10^{-7}/k$ to $120 \times 10^{-7}/k$, assuming that a peak intensity I of the lithium disilicate phase, L2S, is taken as 100.

It is more preferable that the peak intensity I (CR1) of the cristobalite phase is not less than 35 and not more than 60, assuming that the peak intensity I (L2S) of the lithium disilicate phase is taken as 100. In this case, the coefficient of the thermal expansion can be controlled to a range of $85 \times 10^{-7}/k$ to $110 \times 10^{-7}/k$.

The crystallization percentage of the crystallized glass is preferably not less than 60%. That among the crystalline phases lithium disilicate is the main crystalline phase means that the peak intensity of the lithium disilicate is the largest, whereas that the cristobalite phase is an auxiliary crystalline phase means that the peak intensity of the cristobalite phase is smaller than that of the lithium disilicate phase but greater than that of the other crystalline phase(s).

The crystallized glass may contain a petalite phase, a lithium methasilicate phase and a molybdenum lithium phase. However, it is preferable that the crystallized glass does not substantially contain an α-quartz phase, a β-spodumene phase or a β-eucryptite phase. That is, it is preferable that none of these crystalline phases is detected by the X-ray diffraction method or their peak intensities are not more than 5.

$SiO_2$ is an indispensable fundamental ingredient for obtaining the lithium disilicate phase, etc. in the composition of the parent glass. However, if the content of $SiO_2$ is less than 72 wt %, it is difficult to precipitate the cristobalite phase, whereas if the content is more than 82 wt %, it is difficult to melt the glass. From this, it is more preferable that the content of $SiO_2$ is 75 to 80 wt %.

If the content of $Li_2O$ in the parent glass is not less than 8 wt %, particularly preferably not less than 9 wt %, the lithium disilicate phase can be more easily formed. If the content of $Li_2O$ is not more than 12 wt %, preferably not more than 11 wt %, the weather resistance of the crystallized glass can be enhanced.

If the content of $Al_2O_3$ in the parent glass is more than 8 wt %, the eucryptite phase is likely to be formed so that the center-line average height of the surface of the crystallized glass after the fine polishing increases. From this point of view, it is more preferable that the content of $Al_2O_3$ is not more than 6 wt %. Further, the chemical stability of the crystallized glass is improved by setting the content of $Al_2O_3$ at not less than 3 wt %, more preferably not less than 4 wt %.

A desired crystalline phase, particularly the lithium disilicate phase, is precipitated by setting the content of $P_2O_5$ in the parent glass at not less than 1 wt %, particularly preferably at not less than 5 wt %. The glass is made difficult to lose transparency by setting the content of $P_2O_5$ at not more than 3 wt %, preferably not more than 2.5 wt %.

If the content of $ZrO_2$ in the parent glass is set to not less than 0.5 wt %, preferably not less than 1 wt %, the production of the eucryptite phase can be suppressed. By setting the content of $ZrO_2$ to not more than 6 wt %, particularly preferably not more than 4 wt %, the melting point of the glass can be lowered to make the glass more easily melt.

As mentioned below, other ingredients may be incorporated into the above-mentioned $Li_2O$—$Al_2O_3$—$SiO_2$ based crystallized glass.

First, $K_2O$ may be incorporated into the $Li_2O$—$Al_2O_3$—$SiO_2$ based crystallized glass. $K_2O$ has an effect to reduce the melting point and the molding temperature of the glass. In order to further exhibit this effect, the content of $K_2O$ is preferably not less than 1 wt %. The crystallization rate of the glass can be increased by setting the content of $K_2O$ to not more than 5 wt %, preferably not more than 4 wt %.

Furthermore, ZnO may be incorporated into the $Li_2O$—$Al_2O_3$—$SiO_2$ based crystallized glass. ZnO has an effect to increase the solubility of the glass. The loss in transparency of the glass can be prevented by setting the content of ZnO to not more than 5 wt %, preferably not more than 2 wt %.

Either one or both of $As_2O_3$ and $Sb_2O_3$ may be incorporated into the glass in a total amount of 0 to 1 wt %, preferably 0.2 to 0.5 wt %. Of these two, $Sb_2O_3$ is preferred. These compounds function as a refining agent in melting the glass.

Besides the above, 0 to 3 wt % of $B_2O_3$, 0 to 3 wt % of CaO, 0 to 3 wt % of SrO and 0 to 3 wt % of BaO may be incorporated into the glass. Further, $SnO_2$ and/or a fluoride of a noble metal such as platinum may be added alone or as a mixture.

It is preferable that the above $Li_2O$—$Al_2O_3$—$SiO_2$ based crystallized glass contains substantially no MgO component. That the above $Li_2O$—$Al_2O_3$—$SiO_2$ based crystallized glass contains substantially no MgO component does not exclude the MgO component contained as an inevitable impurity in starting material powders of the other components.

The content of molybdenum oxide and/or tantalum oxide in the crystallized glass is 0.5 to 7.0 wt % in total. It the total amount exceeds 7.0 wt %, the melting temperature of the glass increases, or the parent glass is likely to lose the transparency.

If the crystallized glass contains molybdenum oxide with no tantalum oxide, the glass preferably contains 0.5 to 5.0 wt %, preferably 0.5 to 3.0 wt % of molybdenum oxide. If the content is more than 5.0 wt %, the parent glass is likely to lose the transparency.

If the crystallized glass contains tantalum oxide with no molybdenum oxide, the glass preferably contains not more than 7.0 wt %, preferably not more than 6.0 wt % of tantalum oxide. If the content is more than 7.0 wt %, the parent glass is difficult to melt.

If the crystallized glass contains both molybdenum oxide and tantalum oxide, they are contained in a total amount of particularly preferably 0.5 to 6.0 wt %, more preferably 1 to 4 wt %.

Further, $TiO_2$ may be incorporated into the glass. In this case, the content of $TiO_2$ is preferably 0.5 to 5 wt %, and more preferably 0.5 to 3 wt %.

In producing the parent glass, starting materials containing the above metallic atoms are mixed in amounts corresponding to the above weight ratios, respectively, and the mixture is melted. As the starting materials, an oxide, a carbonate, a nitrate, a phosphate and a hydroxide may be recited for each of the metals in the starting materials. Therefore, an oxide, a carbonate, a nitrate, a phosphate and a hydroxide of tantalum and molybdenum are preferred for the tantalum compound and the molybdenum compound. Each of the molybdenum compound and the tantalum compound encompasses a compound containing both molybdenum and tantalum, for example a composite oxide. Further, the open atmosphere, the reducing atmosphere, the steam atmosphere, the pressurized atmosphere or the like may be selected as an atmosphere for crystallizing the parent glass by heating.

In the above producing process, it is preferable that the preform glass is heated such that the heating rate in a temperature range of at least 500° C. and more is controlled to 50 to 300° C./hour so as to proceed the formation of the crystalline nuclei. It is further preferable that the glass is held in a temperature range of at least 500° C. to 580° C. for 0.5 to 4 hours to proceed the formation of the crystalline nuclei.

A magnetic disc substrate can be produced by finely polishing the above crystallized glass with abrasive grains according to a conventional fine polishing method such as so-called lapping, polishing or the like. Further, an under treated layer, a magnetic film, a protective film, etc. may be formed on a main surface of the magnetic disc substrate according to the present invention. Furthermore, a lubricant may be applied onto the protective layer.

EXAMPLES

Preparation of Crystallized Glasses

Compounds containing respective metals in amounts given in Table 1, 2, 3 or 4 in terms of weight ratios of (each figure is wt % units) were mixed. Into a platinum crucible having a volume of 200 cc was charged 250 g of the resulting mixture, which was heated and melted at 1400° C. for 6 hours.

The melt was molded, and the molded product was annealed at 500° C. for one hour, and gradually cooled to obtain a disc-shaped parent glass. A planar test sample having a dimension of 15 mm×15 mm×0.85 mm was cut out from this parent glass. The surface of the above planar test sample was finished with a #400 grinding stone.

Each of test samples thus obtained was sandwiched between 5 mm-thick carbon boards, and crystallized in a nitrogen atmosphere in this state. A crystallizing schedule was that the test sample was heated at a heating rate of 250° C./hour from room temperature, held at 520° C. for 0.5 hour to form nuclei, heated to a crystallization temperature given in corresponding Table at a heating rate of 150° C./hour, held at the crystallization temperature, and then cooled to room temperature at a cooling rate of 150° C./hour.

Identification of Crystalline Phases and Calculation of Constituting Ratio Among the Crystalline Phases Crystalline phases at a surface of a planar crystallized test sample were identified by using an X-ray diffraction device (manufactured by Rigaku Denki Co., Ltd. "Geiger Flex": Tube voltage 30 kV, tube current 20 mA) employing the K α line of copper. At that time, a scanning angle was 2θ=15°~40°.

As a result, a lithium disilicate phase ($Li_2O$—$2SiO_2$: JCPDS No. 40-0376, diffraction angel 2θ=23.8°, 24.3°, 24.8°) was observed as a main crystalline phase for Test sample Nos. 1 to 14 in Tables 1–4, whereas a cristobalite phase ($SiO_2$: JCPDS No.27-0605, diffraction angle 2θ=21.7°) was observed. In Table 1, "L2S" denotes the lithium disilicate, whereas "Cri" does the cristobalite phase".

Although it is considered that a petalite ($Li_2O$—$Al_2O_3$—$8SiO_2$: diffraction angel 2θ=23.9°, 24.3°) was also produced, it is difficult to separate it from the lithium disilicate phase because their diffraction angles overlap.

With respect to the cristobalite phase, although a diffraction peak is observed at a location of a β phase as a high-temperature phase, an inflection point is observed in a range of 140° to 200° on a thermal expansion curve, which shows that an a phase may exist.

Further, a peak intensity I (L2S) of the lithium disilicate phase was taken as a diffraction intensity of a (111) plane of lithium disilicate at 2θ= 24.8°. A peak intensity I (CR1) of the cristobalite phase was taken as a diffraction intensity of a (111) plane of the cristobalite phase at 2θ=21.7°.

Measurement of a Coefficient of Thermal Expansion, α

A planar test sample, 30 mm long, 5 mm wide and 0.85 mm thick was cut to obtain a test sample having a length of 20 mm. The average coefficient of thermal expansion of the thus obtained test sample was measured in a temperature range of −75° C. to 110° C. by using a thermal expansion coefficient measuring device (manufactured by Mac Science Co., Ltd. "TD5030"). The α values thus measured are given in Tables 1 to 4.

Measurement of Ra at a Flat and Smooth Surface of the Test Sample after Fine Polishing The planar test sample crystallized above was lapped to a thickness of 0.670 mm with GC#1000 abrasive grains by using a double-lapping machine. Then, the resulting test sample was polished to a thickness of 0.640 mm with cerium oxide abrasive grains having the particle diameter of 1.2 μm by using a double-polishing machine. Thereafter, the resulting test sample was polished to a thickness of 0.635 mm at a second polishing stage with cerium oxide abrasive grains having the particle diameter of 0.7 μm, thereby obtaining a finely polished product.

The center-line average height (Ra) of a surface of the finely polished product was measured in a tapping mode by an atomic force microscope (manufactured by PSI Co., Ltd. "M5") using a cantilever made of silicon (Resonance frequency: 300 kHz).

Observation of Microstructure

After the finely polished product was etched with a 5% hydrofluoric acid for 3 minutes, the size of crystals was observed with a scanning type electron microscope.

Measurement of Transverse Rupture Strength

A planar crystallized test sample having a dimension of 22 mm×22 mm was subjected to the above-mentioned fine polishing. Then, a test sample of a dimension of 2 mm×20 mm was cut out from the finely polished product, and subjected to a four-point bending test under a condition of a lower span: 15 mm, an upper span: 5 mm and a crosshead speed: 0.5 mm/min. for the measurement of bending strength.

TABLE 1

|  |  | 1 | 2 | 3 | 4 | 5 | 6 |
|---|---|---|---|---|---|---|---|
| Weight ratios of oxides (wt %) | $SiO_2$ | 76.1 | 76.1 | 76.1 | 76.5 | 75.5 | 78.2 |
|  | $Li_2O$ | 9.9 | 9.9 | 9.9 | 9.2 | 9.2 | 10.6 |
|  | $Al_2O_3$ | 5.1 | 5.1 | 5.1 | 5.5 | 5.5 | 4.0 |
|  | $P_2O_5$ | 1.9 | 1.9 | 1.9 | 1.8 | 1.8 | 1.7 |
|  | $ZrO_2$ | 3.0 | 2.0 | 1.0 | 1.0 | 1.0 | 1.0 |
|  | $K_2O$ | 2.8 | 2.8 | 2.8 | 1.8 | 1.8 | 2.2 |
|  | ZnO | — | — | — | — | — | 1.0 |
|  | $Sb_2O_3$ | 0.2 | 0.2 | 0.2 | 0.2 | 0.2 | 0.3 |
|  | $MoO_3$ | 1.0 | 2.0 | 3.0 | 4.0 | 5.0 | 1.0 |
| Crystallization temperature (° C.) |  | 730 | 730 | 730 | 720 | 720 | 780 |
| Crystalline phases |  | L2S Cri | L2S Cri | L2S Cri | L2S Cri LM | L2S Cri LM | L2S Cri |
| Ratio of Cri |  | 46 | 51 | 54 | 47 | 45 | 44 |
| α (×$10^{-7}$/k) |  | 85 | 92 | 92 | 99 | 97 | 103 |
| Ra (Å) |  | 3.5 | 2.7 | 3.7 | 4.5 | 5.5 | 4.9 |

TABLE 2

|  |  | 7 | 8 | 9 | 10 |
|---|---|---|---|---|---|
| Weight ratios of oxides (wt %) | $SiO_2$ | 75.2 | 75.2 | 75.2 | 78.2 |
|  | $Li_2O$ | 10.1 | 10.1 | 10.1 | 10.6 |
|  | $Al_2O_3$ | 4.2 | 4.2 | 4.2 | 4.0 |
|  | $P_2O_5$ | 2.1 | 2.1 | 2.1 | 1.7 |
|  | $ZrO_2$ | 5.0 | 3.0 | 1.0 | 1.0 |
|  | $K_2O$ | 1.1 | 1.1 | 1.1 | 2.2 |
|  | ZnO | — | — | — | 1.0 |
|  | $Sb_2O_3$ | 0.3 | 0.3 | 0.3 | 0.3 |
|  | $Ta_2O_5$ | 2.0 | 4.0 | 6.0 | 1.0 |
| Crystallization temperature (° C.) |  | 760 | 760 | 760 | 790 |
| Crystalline phases |  | L2S | L2S | L2S | L2S |

TABLE 2-continued

|  |  | 7 | 8 | 9 | 10 |
|---|---|---|---|---|---|
|  |  | Cri | Cri | Cri | Cri |
| Ratio of Cri |  | 32 | 50 | 64 | 50 |
| α (×$10^7$/k) |  | 81 | 93 | 107 | 104 |
| Ra (Å) |  | 4.2 | 5.0 | 5.8 | 5.3 |

TABLE 3

|  |  | 11 | 12 | 13 |
|---|---|---|---|---|
| Weight ratios of oxides (wt %) | $SiO_2$ | 76.1 | 76.6 | 76.1 |
|  | $Li_2O$ | 9.9 | 9.7 | 9.7 |
|  | $Al_2O_3$ | 5.1 | 5.7 | 5.7 |
|  | $P_2O_5$ | 1.9 | 2.0 | 2.0 |
|  | $ZrO_2$ | 2.0 | 1.6 | 1.6 |
|  | $K_2O$ | 2.8 | 2.2 | 2.2 |
|  | ZnO | — | 0.5 | 0.5 |
|  | $Sb_2O_3$ | 0.2 | 0.2 | 0.2 |
|  | $MoO_3$ | 1.0 | 1.0 | 1.0 |
|  | $Ta_2O_5$ | 1.0 | — | — |
|  | $TiO_2$ | — | 0.5 | 1.0 |
| Crystallization temperature (° C.) |  | 750 | 740 | 740 |
| Crystalline phases |  | L2S Cri | L2S Cri | L2S Cri |
| Ratio of Cri |  | 60 | 35 | 41 |
| α (×$10^{-7}$/k) |  | 95 | 82 | 85 |
| Ra (Å) |  | 3.8 | 3.3 | 4.0 |

TABLE 4

|  |  | 14 | 15 | 16 |
|---|---|---|---|---|
| Weight ratios of oxides (wt %) | $SiO_2$ | 76.1 | 74.5 | 73.2 |
|  | $Li_2O$ | 9.9 | 9.2 | 10.1 |
|  | $Al_2O_3$ | 5.1 | 5.5 | 4.2 |
|  | $P_2O_5$ | 1.9 | 1.8 | 2.1 |
|  | $ZrO_2$ | 4.0 | 1.0 | 1.0 |
|  | $K_2O$ | 2.8 | 1.8 | 1.1 |
|  | ZnO | — | — | — |
|  | $Sb_2O_3$ | 0.2 | 0.2 | 0.3 |
|  | $MoO_3$ | — | 6.0 | — |
|  | $Ta_2O_5$ | — | — | 8.0 |
| Crystallization temperature (° C.) |  | 770 | — | — |
| Crystalline phases |  | L2S Cri | | |
| Ratio of Cri |  | 43 | | |
| α (×$10^{-7}$/k) |  | 83 | | |
| Ra (Å) |  | 7.0 | | |

Test Results

Each of Test sample Nos. 1 to 13, which had a coefficient of thermal expansion of $81 \times 10^{-7}$/k to $103 \times 10^{-7}$/k, which satisfied the requirements for the magnetic disc substrate. It is considered that this is because the precipitated amount of the cristobalite phase for the lithium disilicate was appropriate.

In each of Test sample Nos. 1 to 3 and 6 in which 1.0 to 3.0 wt % of molybdenum oxide was added, the crystalline phase is almost composed of the lithium disilicate phase and the cristobalite phase, and the Ra after the fine polishing was not more than 5 Å. In Test sample No. 14, the Ra was 7.0 Å, which reveals that an effect due to the addition of molybdenum oxide is conspicuous.

Figure 2:
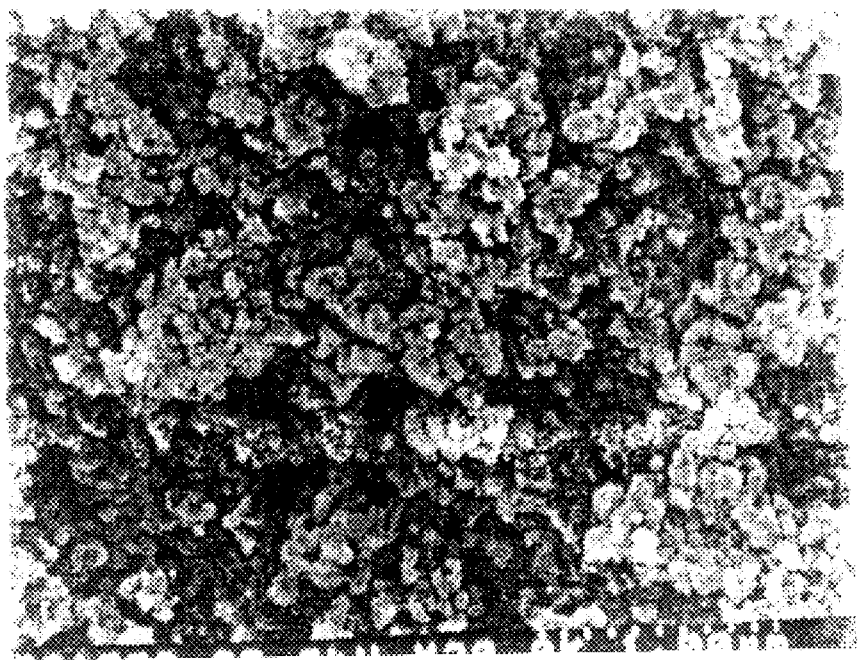
FIG. 2 is a microphotograph of a microstructure in Experiment No. 2 in which dispersed fine particles only, having particle diameters of not more than 0.1 μm are seen.

FIG. 1 is a microphotograph of a microstructure in Experiment No. 14 in which particles in a cristobalite are seen to be cohered at particle diameters of around 0.5 μm. Particles finer than them seem to be those of lithium disilicate. FIG. 2 is a microphotograph of a microstructure in Experiment No. 2 in which dispersed fine particles only, having particle diameters of not more than 0.1 μm are seen. It was impossible to discriminate which particles belong to the cristobalite phase and which particles belong to the lithium disilicate phase. Test sample 2 exhibited bending strength of 230 MPa, which is a satisfactory value for the magnetic disc substrate.

In each of Test sample Nos. 4 and 5 in which 4.0 wt % or 5 wt % of molybdenum oxide was added, the crystalline phase of lithium molybdate (denoted by "LM") was confirmed. Although an effect of this crystalline phase upon Ra seems to be small, Ra becomes larger as compared with a case in which no such a crystalline phase exists. If the content of molybdenum oxide exceeds 4 wt %, the glass was likely to lose transparency during the production thereof in proportion to the increase in the content of molybdenum oxide.

In Test sample No. 15 in which 6.0 wt % of molybdenum oxide was added, the parent glass lost transparency, so that a subsequent evaluation was omitted. That is, this shows that the addition amount needs to be suppressed in a use where transparency loss poses a problem. Particularly for use as a magnetic disc substrate, it is seen that the amount of molybdenum oxide is preferably not more than 5.0 wt %, and more preferably not more than 3.0 wt %.

As shown in Test sample Nos. 7 to 10 in which 2 to 6 wt % of tantalum oxide was added, the Ra after the fine polishing is conspicuously improved as compared with Test sample No. 14, too. This improved effect is more conspicuous in the case of molybdenum oxide.

A different phase corresponding to lithium molybdate is not seen even through the addition of 6 wt % of tantalum oxide. However, when 8 wt % of tantalum oxide was added as in Test sample No. 16, a non-melted material was mixed in melting the raw material at 1400° C., so that a subsequent evaluation was omitted.

Figure 3:
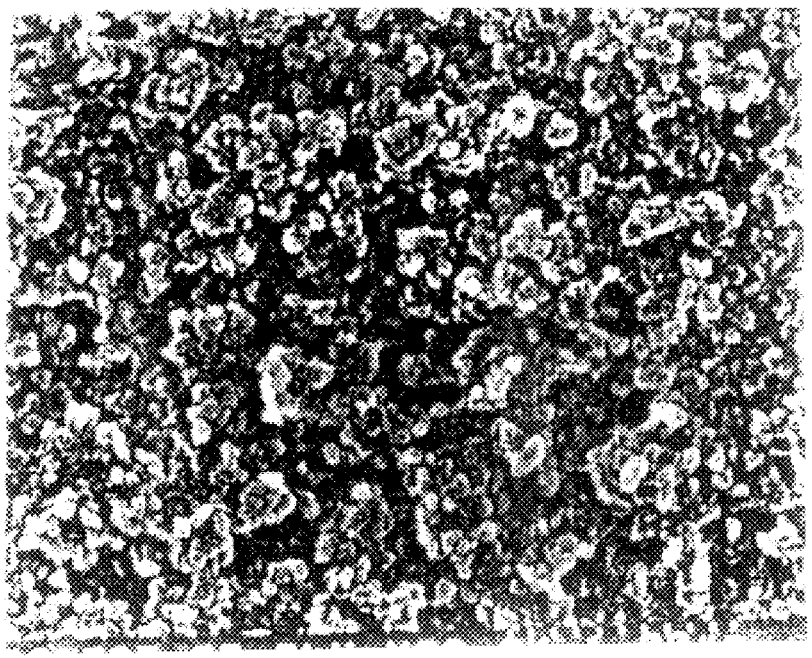
FIG. 3 is a microphotograph of a microstructure in Experiment No. 10 in which dispersed fine particles only, having particle diameters of not more than 0.1 μm are seen.

FIG. 3 is a microphotograph of a microstructure in Experiment No. 10 in which dispersed fine particles only, having particle diameters of not more than 0.1 μm are seen. In Test sample 10, the bending strength was 215 MPa, which is a satisfactory value for the magnetic disc substrate.

Figure 4:
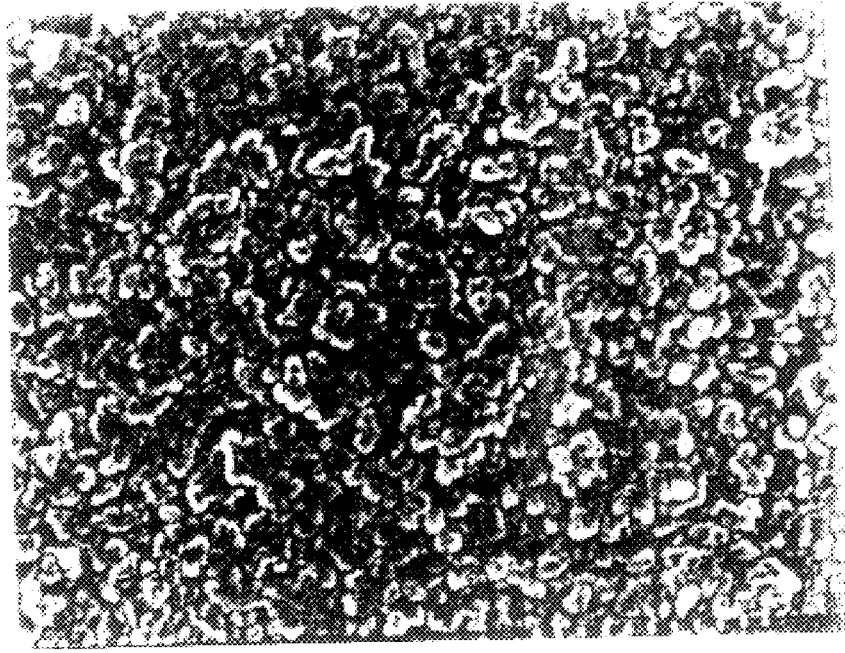
FIG. 4 is a microphotograph of a microstructure in Experiment No. 13 in which dispersed fine particles only, having particle diameters of not more than 0.1 μm are seen.

In Test sample Nos. 11 to 13 in which both molybdenum oxide and tantalum oxide or titanium oxide were incorporated, an effect similar to that in Test sample No. 1 was obtained. FIG. 4 is a microphotograph of a microstructure in Experiment No. 13 in which dispersed fine particles only, having particle diameters of not more than 0.1 μm are also seen.

As mentioned above, the present invention can offer the nucleating agent to promote the dispersion of the cristobalite phase. Further, according to the present invention, when the lithium disilicate phase and the cristobalite phase are precipitated in the $Li_2O$—$Al_2O_3$—$SiO_2$ based crystallized glass, the particles of the cristobalite phase can be made finer, while preventing the cohesion of the cristobalite phase.

What is claimed is:

1. An $Li_2O$—$Al_2O_3$—$SiO_2$ based crystallized glass comprising lithium disilicate, $Li_2O$-$2SiO_2$, as a main crystalline phase, a cristobalite phase as a sub-crystalline phase, and at least one metallic oxide selected from the group consisting of molybdenum oxide and tantalum oxide in a total amount of 0.5 to 7.0% by weight, wherein when a diffraction intensity I of the lithium disilicate phase, L2S, is taken as 100, measured by an X-ray diffraction method, a diffraction intensity I of the cristobalite phase, CR1, is not less than 20 and not more than 70.

2. The crystallized glass set forth in claim 1, which contains 0.5 to 5% by weight of molybdenum oxide, substantially free from tantalum oxide.

3. The crystallized glass set forth in claim 1, which contains 0.5 to 7% by weight of tantalum oxide, substantially free from molybdenum oxide.

4. The crystallized glass set forth in claim 1, which contains molybdenum oxide and tantalum oxide in a total amount of 0.5 to 6.0 wt %.

5. The crystallized glass set forth in claim 1, which contains 72 to 82% by weight of $SiO_2$, 8 to 12% by weight of $Li_2O$, 3 to 8% by weight of $Al_2O_3$, 1 to 3% by weight of $P_2O_5$ and 0.5 to 6% by weight of $ZrO_2$.

6. The crystallized glass set forth in claim 5, which contains 75 to 80% by weight of $SiO_2$, 9 to 11% by weight of $Li_2O$, 4 to 6% by weight of $Al_2O_3$, 1.5 to 2.5% by weight of $P_2O_5$, 1 to 4% by weight of $ZrO_2$, 1 to 4% by weight of $K_2O$, and 0.2 to 0.5% by weight of $Sb_2O_3$% by weight.

7. The crystallized glass set forth in claim 1, which contains 0.5 to 5% by weight of $TiO_2$.

8. The crystallized glass set forth in claim 1, which has a coefficient of thermal expansions in a range of 25° C. to 100° C. being not less than $80 \times 10^{-7}$/K and not more than $120 \times 10^{-7}$/K.

9. A magnetic disc substrate made of the crystallized glass set forth in claim 1, which has a surface with a center line average height (Ra) of not more than 10 Å.

10. A magnetic disc comprising the magnetic disc substrate set forth in claim 9, an under film formed on the surface of the substrate, and a magnetic metallic layer formed on the under film.

11. An $Li_2O$—$Al_2O_3$—$SiO_2$ based crystallized glass comprising lithium disilicate, $Li_2O$-$2SiO_2$, as a main crystalline phase, a cristobalite phase as a sub-crystalline phase, 72 to 82% by weight of $SiO_2$, 8 to 12% by weight of $Li_2O$, 3 to 8% by weight of $Al_2O_3$, 1to 3% by weight of $P_2O_5$, 0.5 to 6% by weight of $ZrO_2$, and at least one metallic oxide selected from the group consisting of molybdenum oxide and tantalum oxide in a total amount of 0.5 to 7.0% by weight.

12. The crystallized glass set forth in claim 11, wherein when a diffraction intensity I of the lithium disilicate phase, L2S, is taken as 100, as measured by an X-ray diffraction method, a diffraction intensity I of the cristobalite phase, CR1, is not less than 20 and not more than 70.

13. The crystallized glass set forth in claim 11, which contains 0.5 to 5% by weight of molybdenum oxide, substantially free from tantalum oxide.

14. The crystallized glass set forth in claim 12, which contains 0.5 to 5% by weight of molybdenum oxide, substantially free from tantalum oxide.

15. The crystallized glass set forth in claim 11, which contains 0.5 to 7% by weight of tantalum oxide, substantially free from molybdenum oxide.

16. The crystallized glass set forth in claim 12, which contains 0.5 to 7% by weight of tantalum oxide, substantially free from molybdenum oxide.

17. The crystallized glass set forth in claim 11, which contains molybdenum oxide and tantalum oxide in a total amount of 0.5 to 6.0 wt %.

18. The crystallized glass set forth in claim 12, which contains molybdenum oxide and tantalum oxide in a total amount of 0.5 to 6.0 wt %.

19. The crystallized glass set forth in claim 11, further comprising 0.5 to 5 % by weight of $TiO_2$.

20. The crystallized glass set forth in claim 12, further comprising 0.5 to 5 % by weight of $TiO_2$.

21. The crystallized glass set forth in claim 11, which has a coefficient of thermal expansion in a range of 25° C. to 100° C. being not less than $80 \times 10^{-7}$/K and not more than $120 \times 10^{-7}$/K.

22. The crystallized glass set forth in claim 12, which has a coefficient of thermal expansion in a range of 25° C. to 100° C. being not less than $80 \times 10^{-7}$/K and not more than $120 \times 10^{-7}$/K.

23. A magnetic disc substrate made of the crystallized glass set forth in claim 11, which has a surface with a center line average height (Ra) of not more than 10 Å.

24. A magnetic disc substrate made of the crystallized glass set forth in claim 12, which has a surface with a center line average height (Ra) of not more than 10 Å.

25. A magnetic disc comprising the magnetic disc substrate set forth in claim 23, an under film formed on the surface of the substrate, and a magnetic metallic layer formed on the under film.

26. A magnetic disc comprising the magnetic disc substrate set forth in claim 24, an under film formed on the surface of the substrate, and a magnetic metallic layer formed on the under film.

27. An $Li_2O$—$Al_2O_3$—$SiO_2$ based crystallized glass comprising lithium disilicate, $Li_2O\text{-}2SiO_2$, as a main crystalline phase, a cristobalite phase as a sub-crystalline phase, and 75 to 80% by weight of $SiO_2$, 9 to 11% by weight of $Li_2O$, 4 to 6% by weight of $Al_2O_3$, 1.5 to 2.5% by weight of $P_2O_5$, 1 to 4% by weight of $ZrO_2$, 1 to 4% by weight of $K_2O$, 0.2 to 0.5% by weight of $Sb_2O_3$%, and at least one metallic oxide selected from the group consisting of molybdenum oxide and tantalum oxide in a total amount of 0.5 to 7.0% by weight.

28. The crystallized glass set forth in claim 27, wherein when a diffraction intensity I of the lithium disilicate phase, L2S, is taken as 100, as measured by an X-ray diffraction method, a diffraction intensity I of the cristobalite phase, CR1, is not less than 20 and not more than 70.

29. The crystallized glass set forth in claim 27, which contains 0.5 to 5% by weight of molybdenum oxide, substantially free from tantalum oxide.

30. The crystallized glass set forth in claim 28, which contains 0.5 to 5% by weight of molybdenum oxide, substantially free from tantalum oxide.

31. The crystallized glass set forth in claim 27, which contains 0.5 to 7% by weight of tantalum oxide, substantially free from molybdenum oxide.

32. The crystallized glass set forth in claim 28, which contains 0.5 to 7% by weight of tantalum oxide, substantially free from molybdenum oxide.

33. The crystallized glass set forth in claim 27, which contains molybdenum oxide and tantalum oxide in a total amount of 0.5 to 6.0 wt %.

34. The crystallized glass set forth in claim 28, which contains molybdenum oxide and tantalum oxide in a total amount of 0.5 to 6.0 wt %.

35. The crystallized glass set forth in claim 27, further comprising 0.5 to 5 % by weight of $TiO_2$.

36. The crystallized glass set forth in claim 28, further comprising 0.5 to 5 % by weight of $TiO_2$.

37. The crystallized glass set forth in claim 27, which has a coefficient of thermal expansion in a range of 25° C. to 100° C. being not less than $80 \times 10^{-7}$/K and not more than $120 \times 10^{-7}$/K.

38. The crystallized glass set forth in claim 28, which has a coefficient of thermal expansion in a range of 25° C. to 100° C. being not less than $80 \times 10^{-7}$/K and not more than $120 \times 10^{-7}$/K.

39. A magnetic disc substrate made of the crystallized glass set forth in claim 27, which has a surface with a center line average height (Ra) of not more than 10 Å.

40. A magnetic disc substrate made of the crystallized glass set forth in claim 28, which has a surface with a center line average height (Ra) of not more than 10 Å.

41. A magnetic disc comprising the magnetic disc substrate set forth in claim 39, an under film formed on the surface of the substrate, and a magnetic metallic layer formed on the under film.

42. A magnetic disc comprising the magnetic disc substrate set forth in claim 40, an under film formed on the surface of the substrate, and a magnetic metallic layer formed on the under film.

* * * * *